(12) United States Patent  
Pedercini et al.

(10) Patent No.: US 9,017,502 B2
(45) Date of Patent: Apr. 28, 2015

(54) METHOD AND DEVICE FOR PRODUCING SLEEVE-LIKE LABELS

(75) Inventors: Maurizio Pedercini, Marmirolo (IT); Daniele Marastoni, San Giovanni in Persiceto (IT)

(73) Assignee: Sacmi Verona S.p.A., Imola (IT)

( * ) Notice: Subject to any disclaimer, the term of this patent is extended or adjusted under 35 U.S.C. 154(b) by 298 days.

(21) Appl. No.: 13/510,562

(22) PCT Filed: Nov. 9, 2010

(86) PCT No.: PCT/EP2010/067092
§ 371 (c)(1),
(2), (4) Date: May 17, 2012

(87) PCT Pub. No.: WO2011/061092
PCT Pub. Date: May 26, 2011

(65) Prior Publication Data
US 2012/0222801 A1 Sep. 6, 2012

(30) Foreign Application Priority Data

Nov. 18, 2009 (IT) .............................. VR2009A0193

(51) Int. Cl.
*B65C 3/00* (2006.01)
*B65C 9/00* (2006.01)
(Continued)

(52) U.S. Cl.
CPC ................ *B65C 3/065* (2013.01); *B29C 53/44* (2013.01); *B29C 63/426* (2013.01); *B29C 65/08* (2013.01); *B29C 65/1412* (2013.01); *B29C 65/16* (2013.01);
(Continued)

(58) Field of Classification Search
CPC ................................ B29C 53/44; B65C 3/065
USPC ....................................... 156/215, 184, 308.2
See application file for complete search history.

(56) References Cited

U.S. PATENT DOCUMENTS 4,347,094 A 8/1982 Watanabe
4,545,832 A 10/1985 Hoffmann
(Continued)

FOREIGN PATENT DOCUMENTS

DE 197 16 079 4/1998
EP 1 862 517 12/2007
(Continued)

OTHER PUBLICATIONS

International Preliminary Report on Patentability for PCT/EP2010/067090 dtd May 22, 2012.
(Continued)

*Primary Examiner* — Jeff Aftergut
(74) *Attorney, Agent, or Firm* — Foley & Lardner LLP

(57) ABSTRACT

A device for producing a sleeve-like label, comprising at least one feeder, designed to feed to at least one forming spindle a portion of heat-shrink film, and elements for wrapping the portion of heat-shrink film around the lateral surface of the forming spindle; elements for detecting the angular position of the free edge of the second longitudinal end of the portion of film wrapped around the forming spindle with respect to an absolute reference system that is jointly connected to the forming spindle; relative movement elements adapted to move the free edge detected by the detection elements to a preset position in order to provide a connecting portion at a preset distance with respect to the free edge, elements being further provided for transferring the sleeve-like label from the forming spindle to a container to be labelled.

9 Claims, 4 Drawing Sheets

(51) Int. Cl.
    *B65C 3/06*     (2006.01)
    *B29C 53/44*     (2006.01)
    *B29C 63/42*     (2006.01)
    *B65C 9/40*     (2006.01)
    *B29C 65/08*     (2006.01)
    *B29C 65/14*     (2006.01)
    *B29C 65/16*     (2006.01)
    *B29C 65/00*     (2006.01)

(52) U.S. Cl.
    CPC ......... *B29C 66/1122* (2013.01); *B29C 66/4322* (2013.01); *B29C 66/49* (2013.01); *B65C 9/40* (2013.01)

(56) References Cited

U.S. PATENT DOCUMENTS

| | | | |
|---|---|---|---|
| 4,976,798 | A | 12/1990 | Hoffman |
| 5,443,668 | A | 8/1995 | Zaborney et al. |
| 5,759,337 | A * | 6/1998 | Fujio et al. ............... 156/443 |
| 7,726,374 | B2 * | 6/2010 | Orlandi et al. ............ 156/568 |
| 7,875,143 | B2 * | 1/2011 | Kontz ........................ 156/215 |
| 8,171,970 | B2 * | 5/2012 | Orlandi et al. ........... 156/379.6 |
| 2005/0119359 | A1 | 6/2005 | Shelby et al. |
| 2006/0237118 | A1 | 10/2006 | Boltshauser |
| 2007/0169874 | A1 | 7/2007 | Kontz |
| 2009/0313947 | A1 | 12/2009 | Orlandi et al. |
| 2010/0018650 | A1 | 1/2010 | Ballarotti |

FOREIGN PATENT DOCUMENTS

| | | |
|---|---|---|
| GB | 2142900 A * | 1/1985 |
| JP | 2000-344217 | 12/2000 |
| WO | WO-95/27613 A1 * | 10/1995 |
| WO | WO-2007/148189 | 12/2007 |

OTHER PUBLICATIONS

International Preliminary Report on Patentability for PCT/EP2010/067092 dtd May 22, 2012.
International Search Report for PCT/EP2010/067090 dtd Mar. 11, 2011.
International Search Report for PCT/EP2010/067092 dtd Feb. 4, 2011.
Office Action dtd Aug. 12, 2014 in JP Patent Application No. JP 2012-539268.
US Office Action in U.S. Appl. No. 13/509,950 Dtd Oct. 22, 2013.
US Office Action in U.S. Appl. No. 13/509,950 Dtd Mar. 26, 2013.
US Office Action in U.S. Appl. No. 13/509,950 Dtd Jun. 18, 2014.
Written Opinion for PCT/EP2010/067090 dtd May 18, 2012.
Written Opinion for PCT/EP2010/067092 dtd May 18, 2012.

* cited by examiner

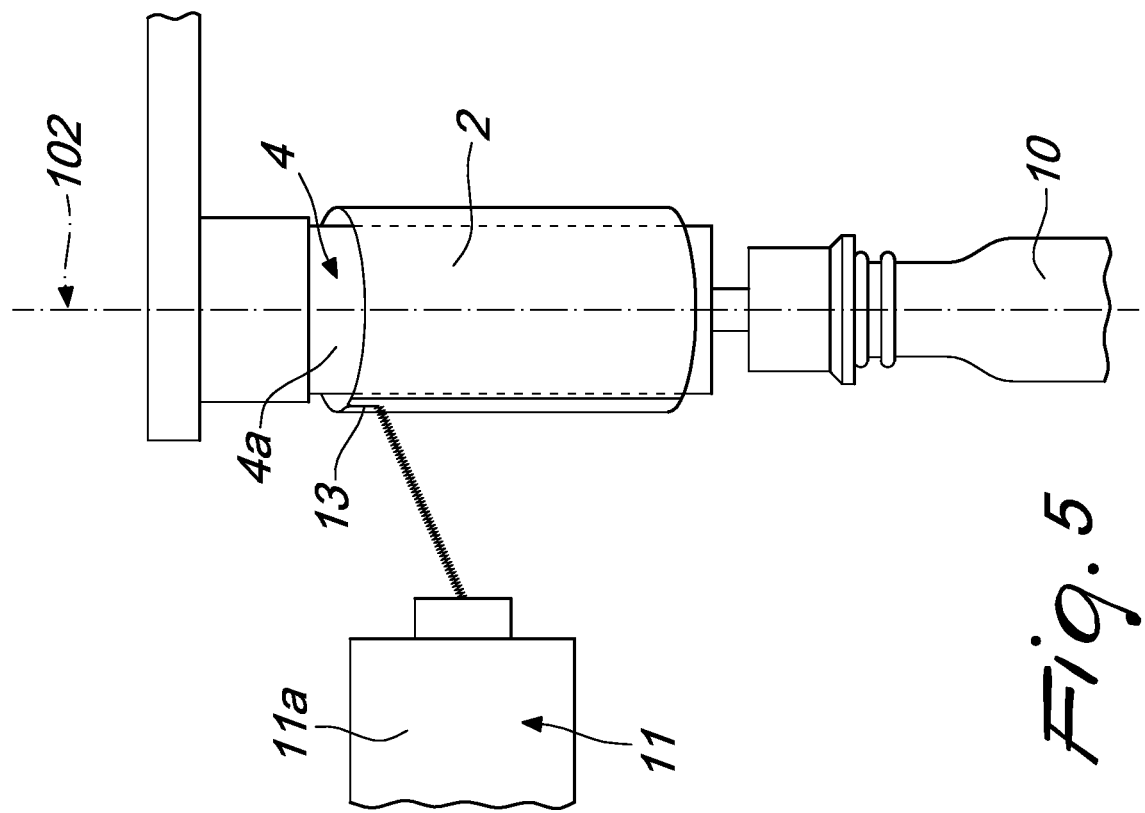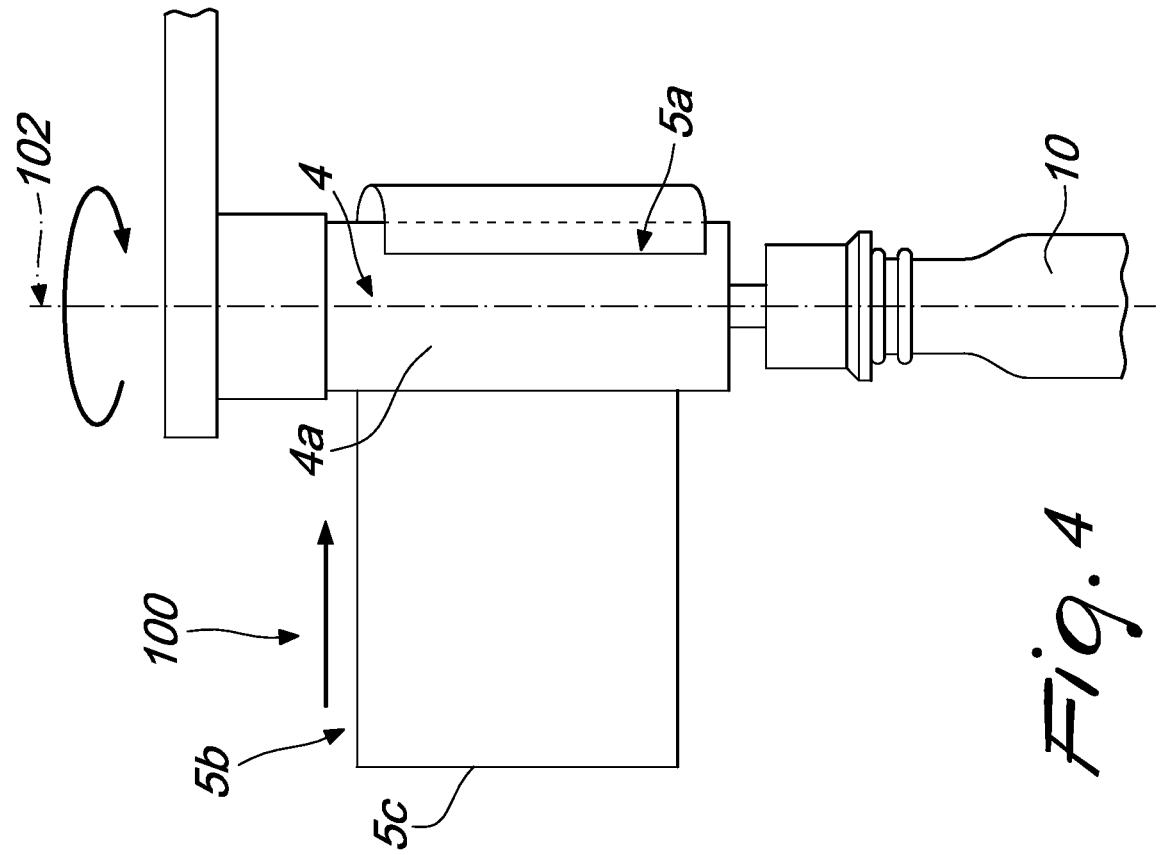

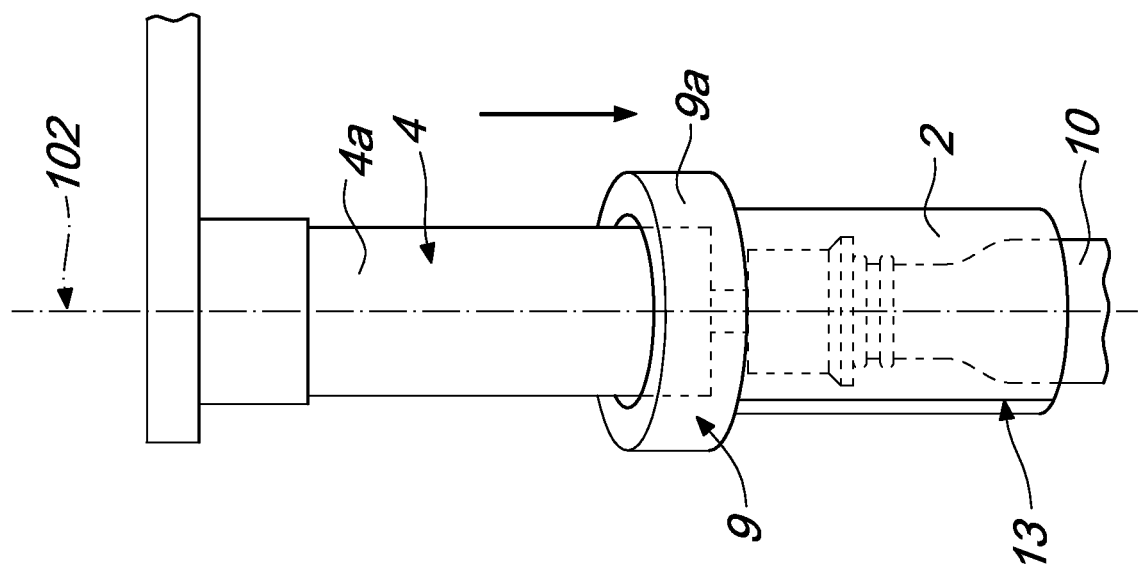
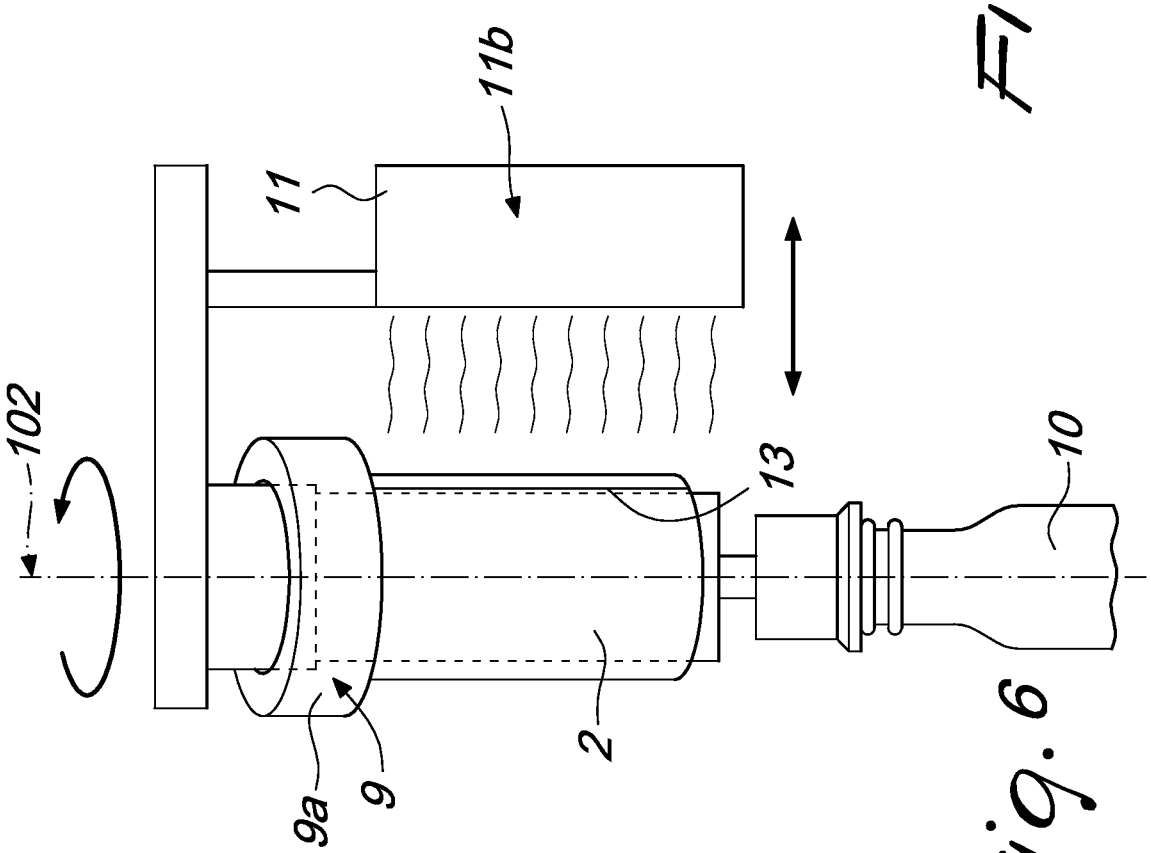

METHOD AND DEVICE FOR PRODUCING SLEEVE-LIKE LABELS

CROSS REFERENCE TO RELATED APPLICATIONS

The present application is a US National Stage of International Application No. PCT/EP2010/067092, tiled Nov. 9, 2010, designating the United States, and claiming priority to Italian Patent Application No. VR2009A000193, filed Nov. 18, 2009.

1. Technical Field

The present invention relates to a method for producing sleeve-like labels and a device for their production.

2. Background Art

Typically, sleeve-like or "shrink sleeve" labels are made of polymeric material such as polyethylene terephthalate (PET), polyvinylchloride (PVC), polypropylene (PP), polystyrene (PS), or other materials which are adapted to be heat-shrunk.

By the term sleeve-like or "shrink sleeve" labels, what is meant here is tubular labels made of plastic film which are designed to be fitted over a respective container to be labelled and subsequently heated, so that the labels shrink onto the outer surface of the container and assume the shape of the outer surface of the container itself.

Sleeve-like labels are usually obtained from a film of heat-shrink plastic material which is unrolled from a reel in order to be fed, by means of the use of a movement device, to a transfer drum.

A cutting device then cuts the plastic film transversely to the direction of advancement, so as to obtain portions of plastic film which have a length that is preset as a function of the dimensions of the container to be labelled.

By means of the transfer drum, the portions of film are transferred to a carousel which is provided with a plurality of spindles, suitably arranged on the periphery of the carousel itself, and shaped so as to receive portions of plastic film from the transfer drum in order to obtain respective tubular sleeves.

In more detail, each spindle comprises an outer cylindrical wall which has a determined diameter that is substantially equal to the preset diameter of the label being made, and upon which each portion of plastic film is wound so that a first longitudinal edge of the portion of plastic film is partially overlapping the opposite edge of such portion in an overlap region, so as to form the tubular sleeve.

At the overlap region, the join is normally executed by using suitable sealing techniques so as to obtain a sleeve-like label.

Advantageously, each spindle can be provided with sealing means which are arranged in order to make the portion of plastic film adhere to and wind around the cylindrical wall.

For the purposes of example, such sealing means can be constituted by a plurality of holes, formed on the cylindrical wall, through which air is aspirated from outside towards the inside of the spindle.

Each spindle can be, moreover, provided with means for expelling the air, which are designed to favour the detachment of the sleeve-like label from such spindle, so as to radially expand the sleeve once the joining operations have been concluded.

Each spindle is generally associated with a support, typically a load plate, which is adapted to receive a container to be labelled, which rests upon such load plate.

Specifically, the sleeve-like label can be placed on the container to be labelled by means of a relative axial movement of the label and the container along the longitudinal axis of the container, so that the sleeve-like label is fitted over the container.

This operation can be implemented by keeping, for example, the label still and moving the container or, more commonly, by keeping the container still and pushing the sleeve-like label from above or from below in order to bring it to fit around the container.

The container and the "shrink sleeve" label associated with it are then brought to a heating station where the label is subjected to a heat treatment that is such as to cause its shrinkage owing to a thermal effect and, therefore, the close adhesion to the lateral surface of the respective container.

A drawback of the sleeve-like labels used nowadays consists in the fact that the connecting portion or seal between the overlapping edges of the label wound around the spindle is normally executed in an intermediate position with respect to the overlap region.

In particular, owing to the tolerances which result from the operations for cutting the portions of film from the supply reel and for transferring these portions first to the transfer drum and then to the forming spindle, it has been observed that the sealing portion executed by the sealing means is sometimes positioned at the edges of the overlap region and, in any case, always in a different position.

In addition to a certain number of discards owing to a non-optimal sealing, this determines a number of defects in the finished product.

One of the most common defects is constituted by the creation of a free flap, which is formed between the connecting line or portion and the free edge of the label which faces outwards, and which, during the subsequent heat-shrinking step, not being fixed to the remaining part of the sleeve-like label, will not adhere closely to the container on which it is fitted, with evident problems from an aesthetic viewpoint.

In particular, in some conditions, the free flap of plastic material substantially assumes the shape of a tab which can be easily caught during the subsequent steps of moving the sleeve-like label from the spindle to the container to be labelled.

Moreover, the free flap of plastic material, as a result of the heat-shrinking process to which the label fitted over the container is subjected in order to favour the adhesion of the label to the lateral surface of such container, forms a ridge which projects transversally with respect to the lateral surface of the container and, in general, such a ridge has an outer edge that is curled and/or hardened by the heat-shrinking process.

The presence of the ridge enormously compromises the aesthetic appearance of the packaging thus obtained.

Moreover, the ridge can also be caught and/or pulled in order to interfere with and/or damage the label thus leading to a decrease in the quality of the packaging and its enjoyment by a hypothetical user.

Such drawback is particularly accentuated for some heat-shrinkable materials, for which the formation of the ridges during the heat-shrinking process is more evident.

In other cases it has been observed that, in order to obtain an optimal heat-shrinking, it is actually necessary to execute the connecting portion at a certain distance from the free edge.

DISCLOSURE OF THE INVENTION

The aim of the present invention is to eliminate, or at least to drastically reduce, the above mentioned drawbacks in known sleeve-like labels.

Within this aim, an object of the invention is to obtain sleeve-like labels which adhere in a homogeneous and long-lasting manner to the container with which they are associated.

Another object of the invention is to provide sleeve-like labels which are free from areas which protrude with respect to a lateral surface of the container.

Another object of the invention is to provide sleeve-like labels that are free from tabs which can be easily grasped or caught, thus damaging the labels.

This aim, as well as these and other objects which will become better evident hereinafter, are achieved by a device for producing a sleeve-like label comprising at least one feeder, designed to feed to at least one forming spindle a portion of heat-shrink film, and means for wrapping said portion of heat-shrink film around the lateral surface of said forming spindle, said wrapping means being designed to provide a region of overlap between a first longitudinal end of said portion of heat-shrink film in contact with said forming spindle and the second longitudinal end of said portion of heat-shrink film, characterized in that it comprises means for detecting the angular position of the free edge of the second longitudinal end of said portion of film wrapped around said forming spindle with respect to an absolute reference system that is jointly connected to the forming spindle, means being provided for the relative movement of said overlap region with respect to a region affected by the action of sealing means which are adapted to form a connecting portion at said overlap region, said relative movement means being adapted to move said free edge detected by said detection means to a preset position in order to provide said connecting portion at a preset distance with respect to said free edge, means being further provided for transferring said sleeve-like label from said forming spindle to a container to be labeled.

According to another aspect, the present invention provides a method for producing sleeve-like labels, comprising:
- a step of feeding at least one portion of heat-shrink film to a forming spindle;
- a step of wrapping said portion of heat-shrink film around said forming spindle, a region of overlap being provided between a first longitudinal end of said portion of heat-shrink film in contact with said forming spindle and the second longitudinal end of said portion of heat-shrink film;
- a step of detecting the angular position of the free edge of said second longitudinal end of said portion of heat-shrink film wrapped around said forming spindle with respect to an absolute reference system that is jointly connected to the forming spindle;
- a step of relative movement of said overlap region with respect to the region of action of sealing means, which are adapted to provide a connecting portion at said overlap region, in order to move said free edge detected by said detection means into a preset position in order to provide said connecting portion at a preset distance with respect to said free edge;
- a step of sealing said first longitudinal end to said second longitudinal end in order to provide said connecting portion at said preset position with respect to said detected free edge;
- a step of transferring said sleeve-like label from said forming spindle toward a respective container to be labeled.

BRIEF DESCRIPTION OF THE DRAWINGS

Further characteristics and advantages of the invention will become better apparent from the following detailed description of some preferred, but not exclusive, embodiments of a device for producing sleeve-like labels, and of the associated production method, according to the invention, illustrated by way of non-limiting example in the accompanying drawings, wherein:

FIG. 4 is a side view showing the step of wrapping a band of heat-shrink film around a respective forming spindle;

FIGS. 5 and 6 show, again in a side view, the step of sealing the first longitudinal end to the second longitudinal end;

FIG. 7 shows, in a side view, the step of transferring the sleeve-like label from the forming spindle to the container to be labelled.

WAYS OF CARRYING OUT THE INVENTION

Figure 1:
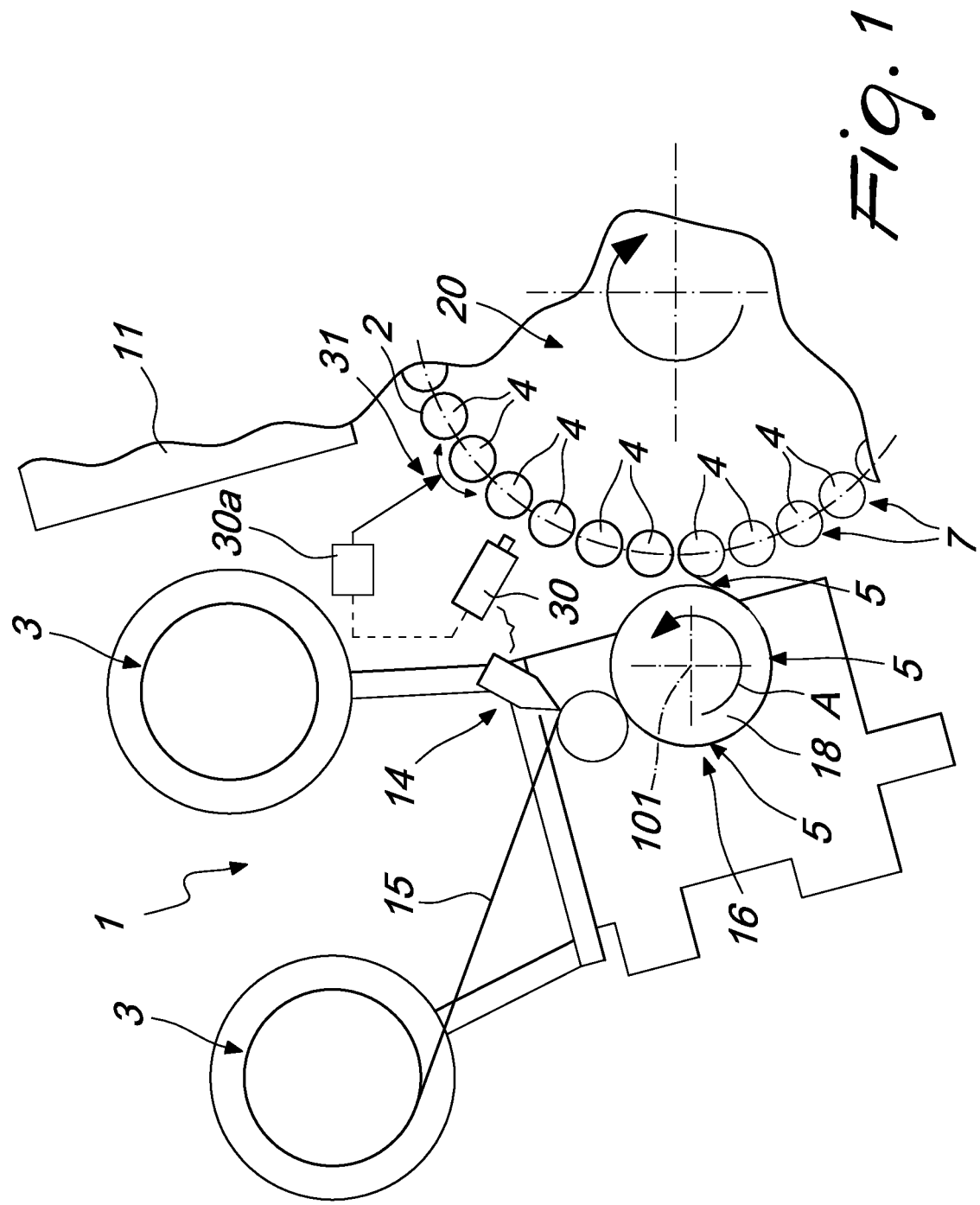
FIG. 1 is a schematic view of a device for producing a sleeve-like label which can be associated with a carousel-type device for feeding containers to be labelled.

With reference to the figures, a device, indicated generally with the reference numeral 1, for producing a sleeve-like label 2 comprises at least one supply feeder which is designed to feed at least one forming spindle 4 with at least one portion of heat-shrink film 5.

For the purposes of example, the supply feeder can be constituted by at least one supply reel 3 which is of a known type and which is designed to feed to at least one forming spindle 4 a portion of heat-shrink film 5.

The device 1 has, furthermore, means 7 for wrapping the or each portion of heat-shrink film 5 around the lateral surface 4a of a respective forming spindle 4.

In particular, the wrapping means 7 are designed to provide a region of overlap 8 between a first longitudinal end 5a of the band of heat-shrink film 5, which is designed to be brought into contact with the lateral surface 4a of the forming spindle 4, and the second longitudinal end 5b of the band of heat-shrink film 5.

According to a distinctive characteristic of the present invention, the device 1 has means 30 of detecting the angular position of the free edge 5c of the second longitudinal end 5b of the portion of heat-shrink film 5 wrapped around the cylindrical surface 4a of the forming spindle 4 with respect to an absolute reference system that is jointly connected to the forming spindle 4.

For the purposes of example, such absolute reference system can be a Cartesian reference which is centred on the axis of rotation 102 of the forming spindle 4 and jointly connected for rotation with a carousel 20.

In more specific detail, means 31 are provided for the relative movement of the overlap region 8 with respect to a region which is affected by the action of sealing means 11 which are adapted to execute a connecting portion 13 at the overlap region 8 so as to form a sleeve-like label 2.

In particular, the relative movement means 31 are adapted to bring the free edge 5c detected by the detection means 30 to a preset position in order to execute the connecting portion 13 at a preset distance from the free edge 5c.

Advantageously, it is possible, in the step of setting up the labelling machine, to set such preset distance as a function of parameters such as, for example, the type of plastic material used to make the label or the type of heat-shrinking to be executed.

In some cases this preset distance can be proximate to zero, so as to execute the sealing portion substantially at the free edge 5c, while in other cases, the connecting portion 13 can be executed in an intermediate position along the extension of the overlap region 8 or, again, it can be proximate to the first longitudinal end 5a.

The detection means 30 can, for example, be constituted by a video camera associated with means 30a for processing the data acquired by the video camera.

In particular, the processing means 30a are adapted to automatically acquire the angular position, with respect to the absolute reference system that is jointly connected with the forming spindle 4, of the free edge 5c of the second end 5b.

Alternatively, the detection means 30 can be constituted by a mechanical probe which is arranged tangentially to the lateral surface 4a of the forming spindle 4 or, again, by a device for detecting the thickness of the portion of heat-shrink film 5 wrapped around the forming spindle 4.

Such thickness detection device has, according to a possible embodiment, a device that emits a laser beam whose wavelength depends on the refractive index and/or on the thickness of the heat-shrink film 5 and a device for receiving the reflected beam which is adapted to detect, based on the thickness of a single layer of film 5, the free edge 5c.

The device 1 has, as mentioned, means 11 for sealing the first longitudinal end 5a to the second longitudinal end 5b of the band of heat-shrink film 5 which is wrapped around the respective forming spindle 4 in order to provide the connecting portion 13 that, advantageously, lies transversely with respect to the direction of longitudinal extension 100 of the band of heat-shrink film 5.

Advisably, such connecting portion can be executed in a position that is proximate to, or at, the free edge Sc of the second longitudinal end 5b.

The connecting portion 13 is, in any case, executed at the overlap region 8 and at a distance which is preset and extremely repeatable from the free edge 5c thanks to the combined action of the detection means 30 and of the relative movement means 31.

Advisably, means 9 are further provided for transferring the sleeve-like label 2 formed around the forming spindle 4 from the forming spindle 4 to a container 10 to be labelled.

According to a first embodiment, the relative movement means 31 comprise a device for the angular movement of the forming spindle 4 with respect to the respective axis of rotation 102. In this regard, the relative movement means 31 can be constituted by means for actuation in rotation of the, or of each, forming spindle 4 around the respective axis of rotation 102.

Alternatively, it is possible for the movement means 31 to be constituted by a movement apparatus which acts on the sealing means 11 and is adapted to direct the region of action of the sealing means 11 (and consequently the connecting portion 13) at a region which is positioned at a preset distance from the free edge 5c which is detected by the detection means 30.

The sealing device 11 can be implemented in various ways. Purely for the purposes of example, the sealing device 11 can be constituted by sealing means chosen from the group that comprises:
 a laser sealing device 11a;
 an infrared sealing device;
 a sealing bar-type sealing device 11b;
 an ultrasonic sealing device.

Advantageously, the device 1 has, between the supply reel 3 and the wrapping means 7, cutting means 14, which are designed to slice a continuous film 15 of polymeric heat-shrink material which is unwound from the supply reel 3 in order to make the portions of film 5.

In more specific detail, the device 1 is provided with means 16 for feeding the portions of film 5 to the wrapping means 7 and, consequently, to the forming spindles 4.

According to a preferred embodiment, the feeder means 16 can be implemented by means of an element for unwinding that is constituted, for example, by a transfer drum 18 from which the supply reel 3 of the continuous film 15 is unwound.

Advisably, the feeder means 16 also comprise the cutting means 14, which, as previously explained, are designed to slice the continuous film 15 unwound from the supply reel 3 in order to make the portions of heat-shrink film 5 that are subsequently used to form the sleeve-like labels 2.

Figure 2:
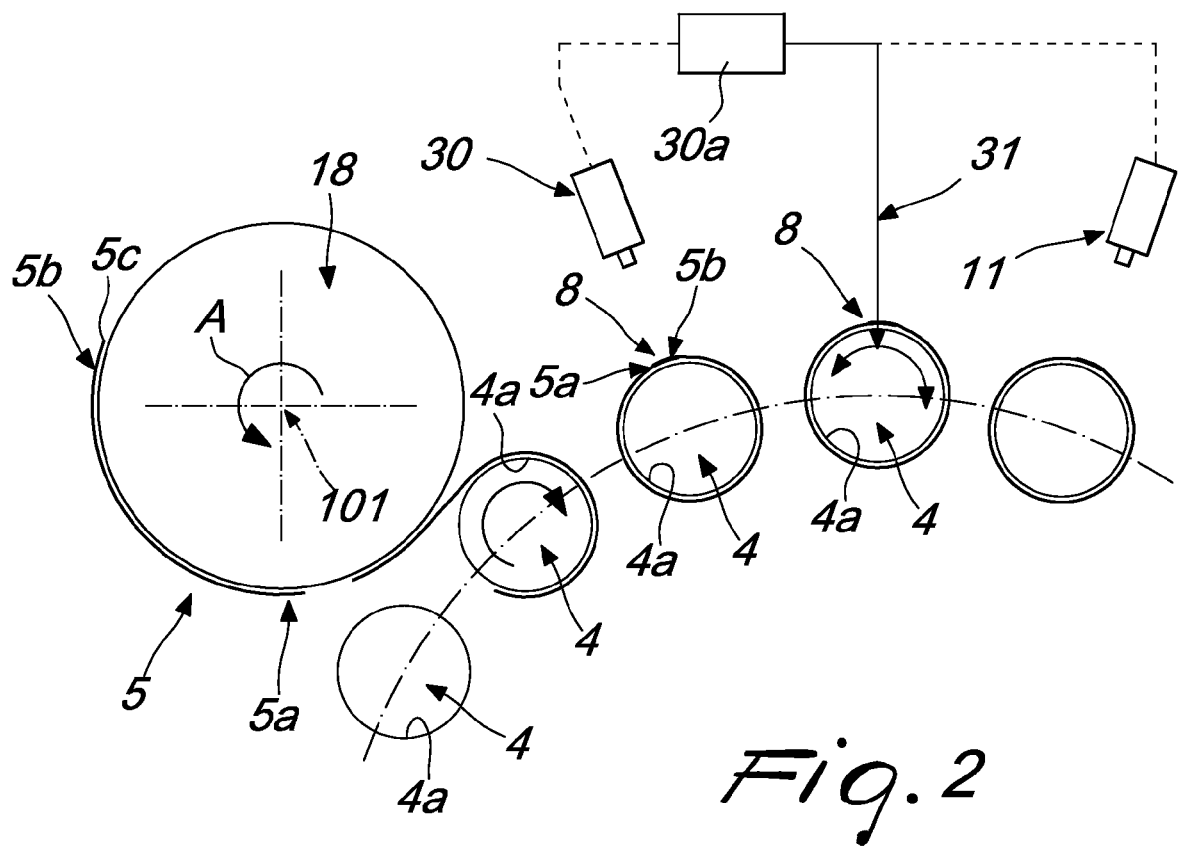
FIG. 2 is an enlarged scale schematic view of the means of wrapping the band of heat-shrink film around the lateral surface of the forming spindles.
Figure 3:
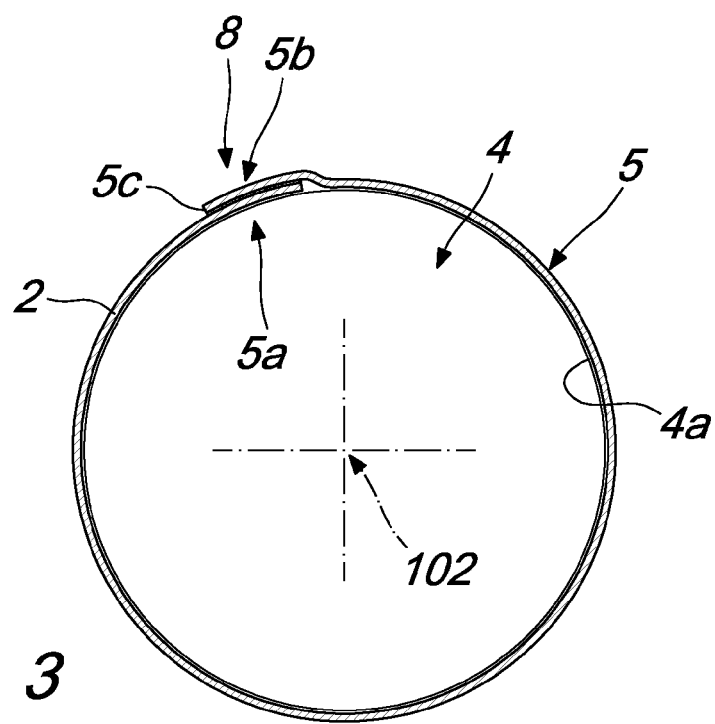
FIG. 3 is an enlarged scale top view of a band of film wrapped around the lateral surface of a respective forming spindle.

As shown in FIGS. 1 and 2, the transfer drum 18 is rotatable about a respective axis of movement 101 according to a direction of rotation which is indicated with the letter A.

According to a practical embodiment, the transfer drum 18 has, in a per se known manner, a lateral wall on which a plurality of holes are formed that are connected to a pneumatic device that is adapted to aspire air into the transfer drum 18 or to expel air from the transfer drum 18, through such holes, as a function of the angular position assumed by such holes, during the rotation of the transfer drum 18, with respect to the axis of movement 101.

In practice, by means of the aspiration of air through the holes it is possible to keep the portions of heat-shrink film 5, obtained one at a time by virtue of the cutting means 14, in adherence to the lateral wall of the transfer drum 18 and, by means of the expulsion of air from the transfer drum 18, it is possible to detach the portions of heat-shrink film 5 from the lateral wall of the transfer drum 18 in order to allow them to be brought to respective wrapping means 7 (which are typically constituted by the forming spindles 4) which are located downstream of the transfer drum 18 and which are arranged, in the embodiment shown, along the peripheral region of the carousel 20, above the containers to be labelled 10.

The forming spindle or spindles 4 that constitute the wrapping means 7 are oriented, with the respective axes 102, substantially parallel to the axis of movement 101 of the transfer drum 18 and are engageable, on their lateral surface 4a, by the portion of heat-shrink film 5 which is made available one at a time by the transfer drum 18 when, by rotating around the carousel 20, they are brought into a position facing the transfer drum 18.

Moreover, the forming spindles 4 are actuated so as to rotate about their corresponding axis 102, in order to wrap, around their lateral surface 4a, the portions of heat-shrink film 5 taken from the transfer drum 18.

Once the winding of the portion of heat-shrink film 5 around the lateral surface 4a of the forming spindle 4 has been completed, the forming spindles 4, by rotating along the carousel 20, are brought to the detection means 30 which are arranged so as to be able to detect the angular position of the free edge 5c and, therefore, consequently, of the overlap region 8.

Once the angular position has been detected, such information is used to command the relative movement means 31 so as to move the forming spindle 4 around its axis of rotation 102 (or move the sealing means 11) in order to ensure that the connecting portion 13 which, downstream, must be executed by the sealing means 11, is positioned exactly at a preset distance from the free edge 5c which was detected by the detection means 30.

In order to ensure an optimal adherence of the portions of heat-shrink film 5 on the lateral surface 4a of the forming spindles 4, there are means of aspiration of air through a plurality of openings formed on the lateral surface 4a of the forming spindles 4.

The means 9 for transferring the sleeve-like label 2 formed by the forming spindle 4 to a container to be labelled 10 can be, for example, constituted by a thrust ring 9a which is moved coaxially towards the respective forming spindle 4 in order to push the sleeve-like label 2 which is wrapped around it towards the container to be labelled 10 which is positioned, in the embodiment shown, below the forming spindle 4.

To facilitate this operation, it may be advisable to interrupt the action of the aspiration means acting on the forming spindle 4 and to activate means of expulsion of air from its openings located on its lateral surface 4a, so as to obtain a detachment of the sleeve-like label 2 from the lateral surface 4a of the forming spindle 4 over which it is fitted.

Obviously, there is no reason why the forming spindle 4, or possibly other types of wrapping means which perform the same function, cannot be arranged below the container to be labelled 10.

According to another aspect, the present invention relates to a method for producing sleeve-like labels 2, comprising:
- a step of unwinding, from a supply feeder, at least one portion of heat-shrink film 5;
- a step of feeding the portion of heat-shrink film 5 to a forming spindle 4;
- a step of wrapping the portion of heat-shrink film 5 around the forming spindle 4, a region of overlap 8 being provided between a first longitudinal end 5a of the portion of heat-shrink film 5 in contact with the forming spindle 4 and the second longitudinal end 5b of the portion of heat-shrink film 5;
- a step of detecting the angular position of the free edge 5c of the second longitudinal end 5b of the portion of heat-shrink film 5 wrapped around the forming spindle 4 with respect to an absolute reference system that is jointly connected to the forming spindle 4;
- a step of relative movement of the overlap region 8 with respect to the region of action of sealing means 9, which are adapted to provide a connecting portion 13 at the overlap region 8, in order to move the free edge 5e detected by the detection means 30 into a preset position in order to provide the connecting portion 13 at a preset distance with respect to the free edge 5c;
- a step of sealing the first longitudinal end 5a to the second longitudinal end 5b in order to provide a connecting portion 13 at a preset position with respect to the detected free edge 5c;
- a step of transferring the sleeve-like label 2 from the forming spindle 4 towards a respective container to be labeled 10.

A distinctive characteristic of the present method consists in providing a step of sealing the first longitudinal end 5a to the second longitudinal end 5b of the band of heat-shrink film 5 which is wrapped around the forming spindle 4 in order to provide a connecting portion 13 that lies transversely with respect to the direction of longitudinal extension 100 of the portion of heat-shrink film 5 and at the free edge 5c, or, according to the characteristics of the sleeve-like label or of the type of heat-shrinking to be performed, at a preset distance from the aforementioned free edge 5c.

For the purposes of example, the step of sealing comprises laser sealing, infrared sealing, sealing bar-type sealing or an ultrasonic sealing device.

According to a first embodiment, the step of separating the band of heat-shrink film 5 from the supply reel 3 comprises a step of cutting a continuous film 15 unwound from the supply reel 3 and the subsequent step of transferring the bands of heat-shrink film 5 thus obtained to the wrapping means 7.

In particular, the cutting step is carried out at cutting regions which are formed on the continuous film 15 which is unwound from the supply reel 3.

In practice it has been found that in all the embodiments the invention is capable of fully achieving the set aim and objects.

Indeed, since the sealing is always executed at the same distance from the free edge 5c, the labels thus obtained have an aesthetic appearance which is considerably improved over that of known labels.

According to the type of heat-shrink film used and/or the type of heat-shrinking to be executed it is possible, once the optimal distance of the connecting portion 13 from the free edge 5c has been identified, to program the relative movement means 31 in order to render this distance constant and repeatable once the angular position of the free edge 5c had been acquired thanks to the aid of the detection means 30.

All the characteristics of the invention, indicated above as advantageous, advisable or similar, may also be missing or be substituted by equivalent characteristics.

The individual characteristics set out in reference to general teachings or to specific embodiments may all be present in other embodiments or may substitute characteristics in such embodiments.

The invention thus conceived is susceptible of numerous modifications and variations, all of which are within the scope of the appended claims.

In practice the materials used, provided they are compatible with the specific use, as well as the dimensions and the shapes may be any, according to the requirements.

Moreover, all the details may be substituted by other, technically equivalent elements.

The disclosures in Italian Patent Application No. VR2009A000193 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for producing sleeve-like labels, comprising:
- a step of feeding a portion of heat-shrink film to a forming spindle;
- a step of wrapping said portion of heat-shrink film around said forming spindle, a region of overlap being provided between a first longitudinal end of said portion of heat-shrink film in contact with said forming spindle and the second longitudinal end of said portion of heat-shrink film;
- a step of detecting the angular position of the free edge of said second longitudinal end of said portion of heat-shrink film wrapped around said forming spindle with respect to an absolute reference system that is jointly connected to said forming spindle;
- a step of relative movement of said overlap region with respect to the region of action of sealing means, which are adapted to provide a connecting portion at said overlap region, in order to move said free edge detected by said detection means into a preset position in order to provide said connecting portion at a preset distance with respect to said free edge;

a step of sealing said first longitudinal end to said second longitudinal end in order to provide said connecting portion at said preset position with respect to said detected free edge;

a step of transferring said sleeve-like label from said forming spindle toward a respective container to be labeled, wherein said step of relative movement of said overlap region is carried out by angularly moving said forming spindle with respect to said absolute reference system jointly connected to said forming spindle.

2. A device for producing a sleeve-like label, comprising a feeder, designed to feed to at least one forming spindle a portion of heat-shrink film, and means for wrapping said portion of heat-shrink film around the lateral surface of said forming spindle, said wrapping means being designed to provide a region of overlap between a first longitudinal end of said portion of heat-shrink film in contact with said forming spindle and the second longitudinal end of said portion of heat-shrink film, further comprising means for detecting the angular position of a free edge of said second longitudinal end of said portion of film wrapped around said forming spindle with respect to an absolute reference system that is jointly connected to said forming spindle, means being provided for the relative movement of said overlap region with respect to a region affected by the action of sealing means which are adapted to form a connecting portion at said overlap region, said relative movement means being adapted to move said free edge detected by said detection means to a preset position in order to provide said connecting portion at a preset distance with respect to said free edge, means being further provided for transferring said sleeve-like label from said forming spindle to a container to be labeled, wherein said relative movement means comprise a device for the angular movement of said forming spindle with respect to said absolute reference system jointly connected to said forming spindle.

3. The device according to claim 2, wherein said relative movement means comprise an apparatus for moving said sealing means in order to move said region affected by the action of said sealing means with respect to said overlap region.

4. The device according to claim 2, wherein said detection means comprise a video camera which is associated with means for processing data acquired by said video camera, said processing means being adapted to acquire automatically the angular position, with respect to said absolute reference system jointly connected to said forming spindle, of said free edge of said second end.

5. The device according to claim 2, wherein said detection means comprise a mechanical probe arranged tangentially to the lateral surface of said forming spindle.

6. The device according to claim 2, wherein said detection means comprise a device for detecting the thickness of said portion of heat-shrink film wrapped around said forming spindle, said thickness detection device comprising a device that emits a laser beam whose wavelength depends on the refractive index and/or on the thickness of said heat-shrink film and a device for receiving the reflected beam.

7. The device according to claim 2, wherein said connecting portion runs from said free edge toward said overlap region.

8. The device according to claim 2, wherein said sealing means comprises sealing means chosen in the group that comprises:
 a laser sealing device;
 an infrared sealing device;
 a sealing bar-type sealing device;
 an ultrasonic sealing device.

9. The device according to claim 2, further comprising a supporting frame for a carousel designed to support said containers to be labelled, a plurality of forming spindles being provided peripherally to said carousel and being adapted to transfer a respective sleeve-like label onto the outer surface of a container to be labelled, said detection means being supported by said supporting frame.

* * * * *